UNITED STATES PATENT OFFICE.

JACOB ADLER, OF RIDGEFIELD PARK, NEW JERSEY.

PROCESS FOR COATING COMPOSITION AND WOODEN ARTICLES.

1,147,066. Specification of Letters Patent. Patented July 20, 1915.

No Drawing. Application filed September 17, 1913. Serial No. 790,275.

*To all whom it may concern:*

Be it known that I, JACOB ADLER, a citizen of the United States, residing at Ridgefield Park, in the county of Bergen and State of New Jersey, have invented certain new and useful Improvements in Processes for Coating Composition and Wooden Articles; and I do hereby declare the following to be a full, clear, and exact description of the invention, such as will enable others skilled in the art to which it appertains to make and use the same.

This invention has for an object an improved process for producing celluloid or a similar coating on wooden or any composition article and more especially on articles of furniture and the manner in which I carry out my process is as follows, using for purposes of illustration a composition article which is to be coated.

The article in its rough state is first dipped into a creosote or similar preservative until the pores of the article are thoroughly saturated with the preservative. The superficial coating of the creosote or similar preservative must then be removed. Otherwise this hydrocarbon preservative would tend to stain the celluloid coating and for this purpose I employ as a solvent ordinary methyl acetone or any other solvent which will act on the preservative in which the article is dipped for a period of about five minutes so as to permeate the tissues of the article to a depth of about one sixteenth of an inch, to which depth the preservative is thus dissolved out of the article. By removing this superficial layer of preservative which has been injected into the pores of the article, I prevent any subsequent staining of the celluloid. Where an article which has been previously painted or varnished is to receive a celluloid coating, I employ exactly the same procedure, that is, I use methyl acetone to remove the superficial coating of paint or varnish so as to prevent any subsequent staining of the celluloid. Where an article has already been painted or varnished it is not necessary to treat same with a wood preservative. After this operation, I take a solution of white shellac in methyl alcohol or ethyl alcohol to which solution has been added a pigment material such as oxid of iron in proportion of about one ounce of oxid of iron to one gallon of white shellac solution. A coating of this filler is applied to the surface of the article by means of a brush. After this solution is dry, I apply successively two coats of any clear celluloid solution, both of which coats are applied by means of a brush. For the celluloid therein, I can substitute a solution of pyralin or other material similar to celluloid. I next apply two coats successively of a similar celluloid solution with a brush but this celluloid solution differs from the last applied in that it contains a small proportion of white pigment such as zinc white, lithopone or similar white pigment which will readily mix with the celluloid solution. This solution should contain only sufficient white pigment to render same opaque and preferably not more than five per cent. of pigmentous material should be mixed with said solution.

For finishing the article, I apply final coats of celluloid solution in which is mixed a large proportion of white pigment rendering the same thoroughly opaque and giving the celluloid solution when dry a firm enamel like appearance.

The last two finishing coats should preferably not be applied with a brush but should be sprayed on with a fine sprayer.

By the preceding process by gradually varying the coats on the article and starting with the ordinary shellac filler and proceeding to a white celluloid coating, I am enabled to obtain a permanent and adherent hard white enamel coating on all composition and wooden articles.

What I claim is:—

1. A process for coating wooden or similar articles by applying a wood preservative, removing said wood preservative from the superficies of said article, applying a shellac filler on the surface of said article and then applying a celluloid solution to said article, said celluloid solution containing an opaque pigment.

2. A process for coating wooden articles by permeating said wooden article with a wood preservative, removing the superficial coating of said wood preservative from the article by means of a solvent, applying a filler to the surface of said article and then applying successive coats of celluloid solution containing an opaque pigment.

3. A process for coating wooden or similar articles by treating the surface thereof with methyl acetone, then applying a filler to the surface of such articles, applying coats of celluloid solution after said filler and finishing said articles by application of successive coats of celluloid solution containing an opaque pigment.

4. A process for coating wooden or similar articles by applying a wood preservative, removing said wood preservative from the superficies of said articles by means of a suitable solvent, applying a shellac filler to the surface of said articles and then applying successive coats of celluloid solutions to said articles, said solutions containing increasing quantities of an opaque pigment up to the final layer.

In testimony whereof I affix my signature in presence of two witnesses.

JACOB ADLER.

Witnesses:
 MAE PERRY,
 HUGO MOCK.